Oct. 30, 1951  W. H. TEETER  2,573,288
REFRIGERATING APPARATUS
Filed May 24, 1949

INVENTOR.
WILFORD H. TEETER
BY
Spencer, Hardman & Fehr.
HIS ATTORNEYS.

Patented Oct. 30, 1951

2,573,288

UNITED STATES PATENT OFFICE 2,573,288

REFRIGERATING APPARATUS

Wilford H. Teeter, Dayton, Ohio, assignor to General Motors Corporation, Dayton, Ohio, a corporation of Delaware Application May 24, 1949, Serial No. 95,018

4 Claims. (Cl. 62—89)

This invention relates to refrigeration and particularly to low temperature refrigerators.

An object of my invention is to provide an improved frozen food and/or ice cream storage cabinet.

Another object of my invention is to provide a top opening ice cream or frozen food storage compartment of a refrigerator cabinet with means for maintaining the temperature throughout the compartment substantially uniform.

A further object of my invention is to provide in addition to refrigerating, a storage compartment of a top opening low temperature cabinet along its bottom and vertical side walls, a means for refrigerating the inner upper portion of the compartment centrally of its side walls.

A further and more specific object of my invention is to extend a portion of a refrigerant evaporating conduit employed to cool walls of an open-top frozen food and/or ice cream storage compartment transversely across the central upper portion of the compartment for maintaining a layer or blanket of stratified cold air over the upper portion of the compartment adjacent its access openings so that products stored in the central upper part of the compartment will be maintained at substantially the same temperature as products stored elsewhere therein.

Further objects and advantages of the present invention will be apparent from the following description, reference being had to the accompanying drawing, wherein a preferred form of the present invention is clearly shown.

Figure 1:
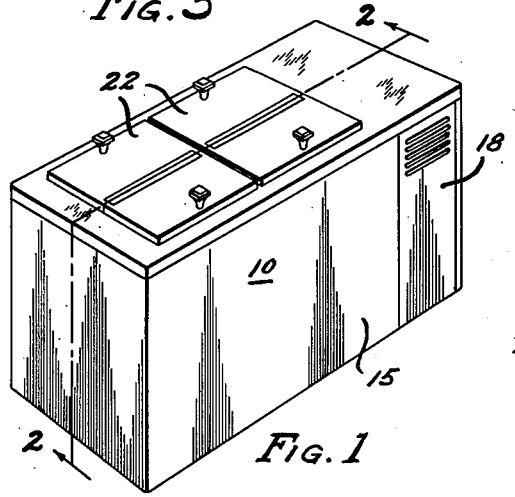
Fig. 1 is a perspective view of a top opening ice cream or frozen food storage refrigerator cabinet having my invention embodied therein.

Referring to the drawing wherein I have shown in Fig. 1 thereof a top opening refrigerator cabinet of the type ordinarily employed for the storage of ice cream, either in cans or packages and/or for the storage of packaged frozen food products. I am aware of the fact that others have endeavored to maintain a uniform temperature throughout the interior of a low temperature storage compartment of a refrigerator cabinet of the type disclosed by concentrating portions of the evaporator of a refrigerating system associated with the cabinet, about the exterior upper part of side walls of the compartment. This cooling of the upper part of side walls of the compartment is somewhat beneficial but is not entirely satisfactory because the cold air is substantially confined to that portion of the upper part of the open-top compartment adjacent its vertical side walls, and falls to the bottom of the compartment without spreading to the upper central portion thereof. Food products located in the upper central part of the storage compartment are not maintained at the same low temperature as food products stored near or adjacent to the refrigerated side walls of the compartment or at points lower down in the compartment. Consequently ice cream dipped from the top portion of a can thereof, removal of packages of ice cream or packages of frozen foods from the upper central part of the compartment will be of a higher temperature and lower quality than food products removed from other localities in the compartment. This is particularly true when the lids or doors of the open-top compartment are frequently opened and closed or when the lids are inadvertently left open for substantial periods of time. I contemplate the provision of means for cooling packages of ice cream or other frozen food products stored in spaced relation to walls of a refrigerated compartment of a low temperature cabinet, particularly in the top central portion thereof, to the same temperature as food products stored elsewhere in the compartment, and which means permits frequent opening and closing of the compartment doors and permits these doors to be left open over relatively long periods of time without materially affecting the air circulation within the compartment and the uniform temperature maintained therein.

Figure 2:
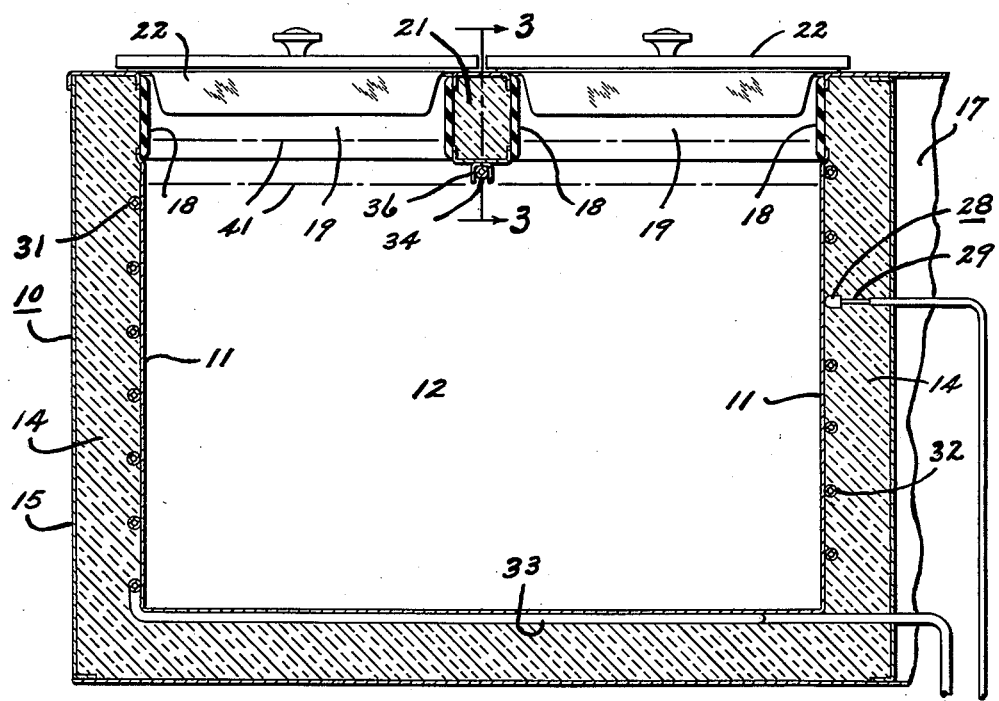
Fig. 2 is an enlarged fragmentary vertical sectional view of the refrigerator shown in Fig. 1, taken on the line 2—2 thereof and diagrammatically illustrating a refrigerating system associated therewith.

Referring again to the drawing, for illustrating my improvement, the refrigerating apparatus comprises a cabinet 10 having a metal open-top tank or liner 11 therein (see Fig. 2) which forms walls of a relative long and wide open-top food storage compartment 12. Insulating material 14 surrounds the walls of liner 11 and metal panels or walls 15 cover the insulation 14. One end wall of compartment 12 is disposed inwardly of one of the outer metal end walls 15 of cabinet 10, so as to provide a machine compartment 17 at one end of the cabinet 10. Compartment 17 is adapted to receive a refrigerant translating unit of a closed refrigerating system associated with the cabinet and shown diagrammatically in Fig. 2. A removable panel or the like 18 (see Fig. 1) may be provided on each long side of cabinet 10 to afford access to the machine compartment 17. The upper part of cabinet 10 may be provided with any suitable or conventional insulated breaker strips or throat construction 18 to prevent conduction between the edges of the open-top tank or liner 11 and the top metal wall part of cabinet 10. Extending transversely across the open top of tank or liner 11 there is a divider wall or mullion 21 suitably insulated and provided with the same breaker strip or throat construction as is disposed above the top edges of the liner 11. The wall or mullion 21 divides the open top of compartment 12 into a plurality of access openings 19 leading to the interior of the compartment. Each access opening is normally closed by a lid or door 22 which cooperates with the top surface of cabinet 10, along edges of the access openings 19 thereof, and with the upper edges of wall or mullion 21 to close the access openings. In the present disclosure these doors or lids are shown as being of the double hinged type substantially as illustrated in my Patent No. 2,241,101 dated May 6, 1941.

Figure 4:
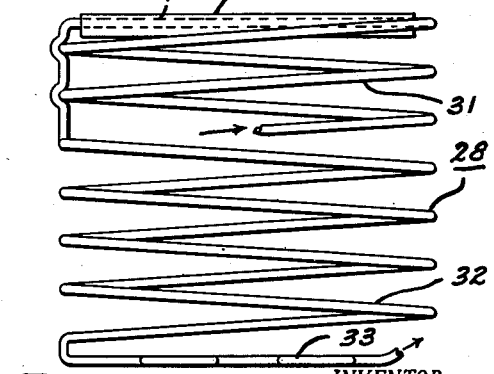
Fig. 4 is a view illustrating the formation of the evaporator conduit employed to cool the food compartment of the cabinet.

The closed refrigerating system associated with cabinet 10 includes a refrigerant translating unit comprising a motor-compressor 26, a condenser 27, and an evaporator generally represented in Fig. 4 by the reference character 28. Suitable conduit connections as is conventional in the art connect the elements of the refrigerating system in closed circuit relation and a restrictor or expansion valve 29 controls the flow of liquid refrigerant, liquefied by the translating unit, to the evaporator 28 for expansion or evaporation therein so as to remove heat from the compartment 12. The motor-compressor element 26 may be caused to operate and/or to stop operating by any suitable control system (not shown) as is conventional in the art. Evaporator 28 is in the form of a refrigerant conveying metal conduit bent or coiled to the desired shape. In Fig. 4 of the present disclosure I have shown the evaporator conduit bent or formed to provide first convolutions 31, which contact and extend over the vertical side walls of metal liner 11, second convolutions 32, which also contact and extend over the side walls of liner 11, and third convolutions 33, which contact and extend along the bottom wall of the liner. The convolutions of the evaporator are connected in series flow relationship and evaporator 28 has a conduit portion 34 which connects the first and second named convoluted portions 31 and 32 thereof together. It is this connecting conduit portion 34 of evaporator 28 which becomes important in the present invention.

Figure 3:
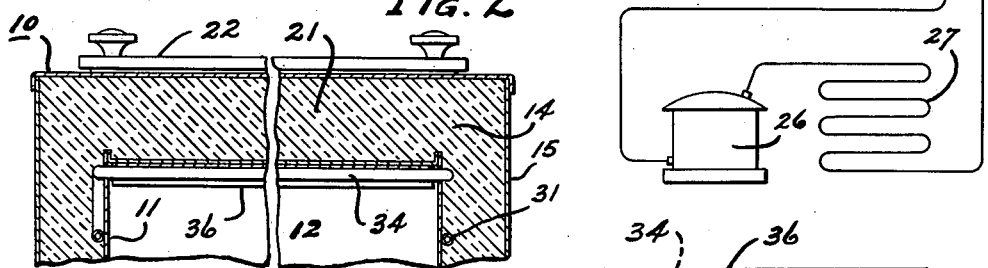
Fig. 3 is a fragmentary vertical sectional view taken on the line 3—3 of Fig. 2.

The conduit portion 34 intermediate the first convoluted portion 31 and the second convoluted portion 32 of evaporator 28 is secured in intimate thermal contact with a metal fin member 36, which member is in turn secured or clamped, in any suitable or desirable manner, to and extends along the underside of the dividing wall or mullion wall 21. Fin member 36 is of inverted U-shape in cross-section and straddles the conduit portion 34 extending along the underside of the mullion 21 with the leg portions thereof depending a short distance below the conduit. Conduit portion 34 of evaporator 28 is exposed to the air within compartment 12 while other portions of the evaporator, such as convolutions 31, 32 and 33 are outside of the compartment and cool the compartment through walls of the metal tank or liner 11. It will be noted by reference to Fig. 3 of the drawing that the conduit portion 34 of evaporator 28 projects through an opening in the upper portion of each side wall of liner 11 so as to be positioned within the compartment 12 and extended along the underside or bottom of the mullion 21.

When the refrigerating system is in operation liquid refrigerant is directed from the condenser 27 toward restrictor 29 which controls its flow into the evaporator 28. Upon entering the evaporator the refrigerant flows through the first convolutions 31, through the conduit portion 34, through the second convolutions 32 and thence through the third convolutions 33 back to the motor-compressor casing 26. The refrigerant flowing in thermal heat exchange relationship with the metal walls 11 of compartment 12 abstracts heat from the compartment to thereby cool the interior thereof. Refrigerant evaporating in the connecting conduit portion 34 of evaporator 28 directly cools the air in the central upper portion of compartment 12. The cooling produced by conduit portion 34 of evaporator 28 creates or effects the formation of a layer of substantially stratified air, indicated by the dot-dash lines 41 in Fig. 2, in the upper portion of compartment 12 above the top of ice cream cans, packages of ice cream or frozen packaged foods stored therein. The temperature at the bottom of the layer of stratified air corresponds substantially to the low temperature maintained in the compartment 12 and the temperature of the layer of stratified air at the top thereof is more near room temperature. This layer of stratified or dead air forms an insulating buffer blanket, to some degree, over the low temperature air in the compartment and prevents in filtration of room air into the refrigerated air of the compartment. By virtue of the refrigerating effect produced by conduit portion 34, near the central upper portion of the interior of compartment 12 and the resultant layer of stratified air, packages of frozen foods or ice cream placed in the upper central part of compartment 12 will be maintained at the same low temperature as packages placed or located nearer to the side walls of the compartment or nearer to the bottom thereof. Also the stratified layer of air in the top of the food compartment, when the lids or doors are open or when the same are left open, prevents warm room air from rushing into the compartment and materially increasing the temperature in the upper part thereof. Since packages of frozen foods are seldom stored in or above the layer of stratified air, such layer of air permits the lids or doors to be left open during rush shopping hours in order to display the contents of the refrigerated compartment without great loss in efficiency and operating costs of the refrigerating system associated with the apparatus.

From the foregoing it should be apparent that I have provided improved storage for ice cream or other frozen food products in a low temperature refrigerator cabinet. My invention reduces to a minimum the temperature gradient between frozen food packages stored in various localities within a storage compartment and insures that packages of frozen food removed from the upper central portion of the compartment will be of the same quality and substantially of the same temperature as packages of food removed from other portions of the compartment. When a part of the compartment is utilized for the storage of cans of bulk ice cream my improvement insures that the ice cream in the upper portion of the cans will be maintained at substantially the same hardness and quality as ice cream contained adjacent the refrigerated walls or in the lower portion of the cans.

Also by virtue of directly cooling the upper interior central portion of the open-top compartment and of effecting the stratified layer of air therein the compartment lids may be removed as desired to render the cabinet usable as an open-top selfserve refrigerating apparatus in grocery and the like stores.

While the form of embodiment of the invention as herein disclosed, constitutes a preferred form, it is to be understood that other forms might be adopted, as may come within the scope of the claims which follow.

What is claimed is as follows.

1. A refrigerating apparatus comprising in combination, a cabinet, walls forming an open-top compartment within said cabinet, said cabinet having a mullion extending transversely across the open top of said compartment to provide a plurality of access openings thereto, doors cooperating with said mullion for closing said access openings, a closed refrigerating system associated with said cabinet including a refrigerant translating unit and an evaporator for cooling said compartment, said evaporator being in the form of a conduit having first and second convolutions and an intermediate portion connecting said first and said second convolutions in series flow relationship with one another, said conduit convolutions contacting and extending over walls of said compartment, and said intermediate connecting conduit portion of said evaporator being secured to the lower part of said mullion and extending therealong for abstracting heat from the upper central portion of said compartment.

2. A refrigerating apparatus comprising in combination, a cabinet, walls forming an open-top compartment within said cabinet, said cabinet having a mullion extending transversely across the open top of said compartment to provide a plurality of access openings thereto, doors cooperating with said mullion for closing said access openings, a closed refrigerating system associated with said cabinet including a refrigerant translating unit and an evaporator for cooling said compartment, said evaporator being in the form of a conduit having first and second convolutions and an intermediate portion connecting said first and said second convolutions in series flow relationship with one another, said conduit convolutions contacting and extending over walls of said compartment, said intermediate connecting conduit portion of said evaporator being secured to the lower part of said mullion and extending therealong, and a substantially inverted U-shaped fin member straddling said connecting conduit portion and being in intimate thermal contact therewith for conducting heat from the upper central portion of said compartment thereto.

3. A refrigerating apparatus comprising in combination, a cabinet, walls forming an open-top compartment within said cabinet, said cabinet having a mullion extending transversely across the open top of said compartment to provide a plurality of access openings thereto, doors cooperating with said mullion for closing said access openings, a closed refrigerating system associated with said cabinet including a refrigerant translating unit and an evaporator for cooling said compartment, said evaporator being in the form of a conduit having first, second and third convolutions and intermediate portions connecting said convolutions in series flow relationship with one another, said first and said second conduit convolutions contacting and extending over the exterior surfaces of the side walls of said compartment, said third conduit convolution contacting and extending over the exterior surface of the bottom wall of said compartment, and the intermediate conduit portion connecting said first and said second convolutions of said evaporator extending along and being secured to the underside of said mullion in exposed relation to the air within said compartment for abstracting heat from the upper central portion of said compartment.

4. A refrigerating apparatus comprising in combination, a cabinet including a bottom and upright walls forming an open top compartment therein, said cabinet having a mullion extending transversely across the open top of said compartment and forming access openings thereto one on either side of said mullion, a closed refrigerating system associated with said cabinet including a refrigerant translating unit and an evaporator, said evaporator being in the form of conduit convolutions contacting and extending over a plurality of said upright walls of the compartment and maintaining the interior thereof at a temperature below freezing, and said evaporator including a conduit portion connected in series flow relationship with said conduit convolutions thereof extending along the underside of said mullion in exposed relation to the interior of said compartment for cooling and effecting the formation of a buffer layer of cold stratified air across the top portion of the compartment.

WILFORD H. TEETER.

REFERENCES CITED

The following references are of record in the file of this patent:

UNITED STATES PATENTS

| Number | Name | Date |
| --- | --- | --- |
| 1,929,074 | Main | Oct. 3, 1933 |
| 2,122,744 | Jordan et al. | July 5, 1938 |
| 2,158,382 | Saha | May 16, 1939 |
| 2,279,483 | Munshower | Apr. 14, 1942 |
| 2,450,114 | Burney | Sept. 28, 1948 |
| 2,477,393 | Skoog et al. | July 26, 1949 |